United States Patent [19]

Dunphy et al.

[11] 3,770,573

[45] Nov. 6, 1973

[54] INTERDIFFUSIONALLY BONDED STRUCTURES OF POLYIMIDE POLYMERIC MATERIAL

[75] Inventors: James Francis Dunphy, Lawrence, Kans.; John Anthony Kreuz, Columbus, Ohio; Don Albert Roper, Belen, N. Mex.

[73] Assignee: E. I. duPont de Nemours and Company, Wilmington, Del.

[22] Filed: June 8, 1971

[21] Appl. No.: 150,910

[52] U.S. Cl. ... 161/227, 117/138.8 UA, 117/161 P, 156/246
[51] Int. Cl. ............................................. B32b 27/28
[58] Field of Search ............................ 161/227, 252; 117/161 P, 138.8 UA

[56] References Cited
UNITED STATES PATENTS

| | | | |
|---|---|---|---|
| 3,607,387 | 9/1971 | Lanza et al. | 161/227 X |
| 3,345,342 | 10/1967 | Angelo | 161/227 UX |
| 3,505,168 | 4/1970 | Dunphy et al. | 161/227 |
| 3,684,646 | 8/1972 | Kreuz et al. | 161/227 X |

*Primary Examiner*—Alfred L. Leavitt
*Assistant Examiner*—David A. Simmons
*Attorney*—Donald W. Huntley

[57] ABSTRACT

Laminar film structures of layers of polyimide polymeric material interdiffusionally bonded together, including structures having one non-heat-sealable polyimide layer interdiffusionally bonded to a heat-sealable polyimide layer; the structures being useful in the form of narrow tapes for electrical insulation purposes such as wrapping electrical conductors.

4 Claims, No Drawings

INTERDIFFUSIONALLY BONDED STRUCTURES OF POLYIMIDE POLYMERIC MATERIAL

BACKGROUND OF THE INVENTION

Multi-layered articles of organic polymeric films, such as polyolefins and polyvinyl halides, wherein the layers are adhered together by means of an adhesive interlayer, have previously been used where a combination of physical properties is required that is not possessed by the individual materials of the composite. The principal disadvantage of previous multilayered structures resides in the lack of efficient adhesive systems for bonding the layers together. Furthermore, it is necessary in many instances to increase adherability by pretreating the film surfaces prior to applying the adhesive material. Additionally, in the case of multi-layered structures of polyimides, known adhesives do not generally possess the high temperature heat stability of the polyimide polymeric material itself, and the strength of the adhesive bonds in such laminar structures deteriorates rapidly when subjected to elevated temperatures.

SUMMARY OF THE INVENTION

The instant invention provides laminar structures of polyimide polymeric material having excellent bond strength that are prepared without recourse to either adhesives per se or activation of the surface of each layer prior to bonding.

Specifically, there is provided a unitary laminar film structure having at least two layers of polyimide polymeric material interdiffusionally bonded together, wherein the polyimide is characterized by the following repeating structural unit:

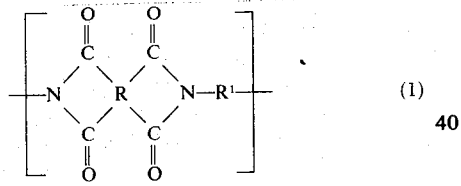

(1)

where R is selected from tetravalent aromatic organic radicals, including substituted derivatives thereof, having the following structural formulas:

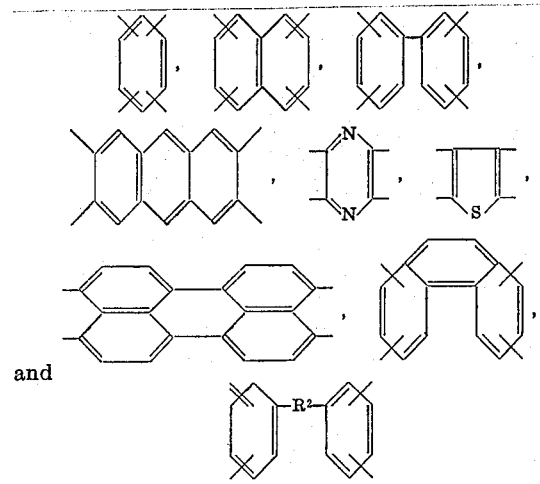

and where $R^2$ is selected from alkylene of 1–3 carbon atoms, oxygen, sulfur, and radicals having the following structural formulas:

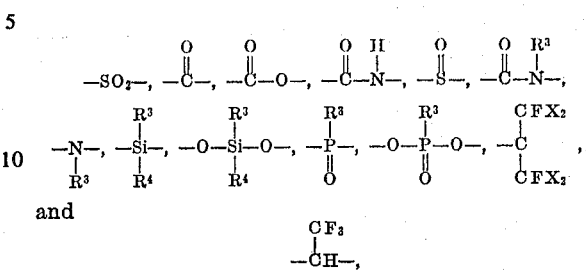

and

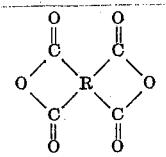

wherein $R^3$ and $R^4$ are selected from alkyl and aryl, and substituted groups thereof, and each X is separately chosen from the group consisting of F and Cl, the said R being such as obtained from a dianhydride of the formula

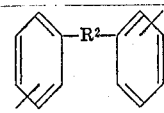

where R has the same meaning as above; and where $R^1$ is a divalent radical of at least 2 carbon atoms.

Preferably $R^1$ is selected from arylene, phenylene, naphthylene, biphenylene, anthrylene, furylene, benzfurylene, and wherein $R^2$ is as defined above. The $R^1$ groups are conveniently derived from organic diamines having the formula $H_2N$—$R^1$—$NH_2$ where $R^1$ is as above defined.

There is further provided, according to the present invention, a process for making interdiffusionally bonded film structures of laminar construction of the above-described polyimides which comprises coating at least one surface of a base gel film structure with a polyamide-acid composition and thereafter converting the coated base film to a unitary polyimide film structure.

DESCRIPTION OF THE PREFERRED EMBODIMENTS

The present invention provides a unitary film structure having multiple layers or strata interdiffusionally bonded together. The expressions "interdiffusional bonding", "interdiffusionally bonded" and similar terms mean that the polymeric chains of the polymeric material constituting a layer or stratum of the unitary structure of the invention are diffused into the polymeric chains of the polymeric material constituting an adjacent layer or stratum of the unitary structure. For instance, in a representative embodiment of the unitary structure consisting of two layers or strata denominated for exemplary purposes as A and B, the polymeric chains of the polymeric material in layer A are diffused into the polymeric chains of the polymeric material in layer B, and vice-versa, and the adhesion of the layers A and B together into a unitary shaped structure obtains without recourse to adhesives interposed between the contacting surfaces of layers A and B or subjecting the surfaces of either of layers A or B to adhesion promoting or activating treatments.

To obtain the bond strength required for most composites, it is necessary that the polymer chains be interdiffused to the extent that quantities of the polymeric material of each of the adjacent layers are present throughout an interface having a thickness of at least 25 angstroms.

The degree of the interdiffusion of the two adjacent lamina can be determined by one of several methods depending on the particular materials comprising the adjacent lamina. For example, thin cross sections of the laminate can be taken and microscopically examined. Alternatively, with dissimilar polyimide lamina, the surface of the laminate can be ground with potassium bromide and successive layers analyzed by means of infrared analysis. By this method, the analysis of the successive layers will illustrate the percentage of each polymer present at each layer of grinding. The lamination of pigmented onto clear films is especially amenable to examination by microscope in which the gradual change from pigmented to clear structures can be observed.

The unitary film structures of the present invention are preferably about from 0.25 to 150 mils thick, and are characterized by interdiffusionally bonded layers of polyimide polymeric material of structural formula (1) hereinabove. Such polyimides can be obtained from polyamide-acid precursors which are obtained by reacting suitable diamines with suitable dianhydrides in the manner described in, for example, U. S. Pat. No. 3,179,614. Polyimides which can be used in the laminar structures of the present invention can be prepared from dianhydrides and diamines, as described in the above patent. Dianhydrides which can be used in such preparation include:
  pyromellitic dianhydride;
  3,4,9,10-perylene tetracarboxylic dianhydride;
  naphthalene-2,3,6,7-tetracarboxylic dianhydride;
  naphthalene-1,4,5,8-tetracarboxylic dianhydride;
  bis(3,4-discarboxyphenyl) ether dianhydride;
  bis(3,4-dicarboxyphenyl) sulfone dianhydride;
  2,3,2',3 2,3,2',3'-benzophenonetetracarboxylic dianhydride;
  bis(3,4-dicarboxyphenyl) sulfide dianhydride;
  bis(3,4-dicarboxyphenyl) methane dianhydride;
  2,2-bis(3,4-dicarboxyphenyl) propane dianhydride;
  2,2-bis(3,4-dicarboxyphenyl) hexafluoropropane;
  3,4,3',4'-biphenyltetracarboxylic dianhydride;
  2,6-dichloronaphthalene-1,4,5,8-tetracarboxylic dianhydride;
  2,7-dichloronaphthalene-1,4,5,8-tetracarboxylic dianhydride;
  2,3,6,7-tetrachloronaphthalene-1,4,5,8-tetracarboxylic dianhydride;
  phenanthrene-1,8,9,10-tetracarboxylic dianhydride;
  pyrazine-2,3,5,6-tetracarboxylic dianhydride;
  benzene-1,2,3,4-tetracarboxylic dianhydride; and
  thiophene-2,3,4,5-tetracarboxylic dianhydride.
Diamines which can be used together with dianhydrides in polyimide preparation include the following:
  meta-phenylenediamine;
  para-phenylenediamine;
  2,2-bis(4-aminophenyl) propane;
  4,4'-diaminodiphenylmethane;
  4,4'-diaminodiphenyl sulfide;
  4,4'-diaminodiphenyl sulfone;
  3,3'-diaminodiphenyl sulfone;
  4,4'-diaminodiphenyl ether;
  2,6-diaminopyridine;
  bis(3-aminophenyl) diethyl silane;
  benzidine;
  3,3'-dichlorobenzidine;
  3,3'-dimethoxybenzidine;
  4,4'-diaminobenzophenone;
  N,N-bis(4-aminophenyl)-n-butylamine;
  N,N-bis(4-aminophenyl) methylamine;
  1,5-diaminonaphthalene;
  3,3'-dimethyl-4,4'-diaminobiphenyl;
  m-aminobenzoyl-p-aminoanilide;
  4-aminophenyl-3-aminobenzoate;
  N,N-bis(4-aminophenyl) aniline;
  2,4-bis(beta-amino-t-butyl) toluene;
  bis(p-beta-amino-t-butylphenyl) ether;
  p-bis-2-(2-methyl-4-aminopentyl benzene;
  p-bis(1,1-dimethyl-5-aminopentyl benzene;
  m-xylylenediamine;
  p-xylylenediamine;
  position isomers of the above, etc., and mixtures thereof.

The preparation of polyimides and polyamide-acids is more fully described in U. S. Pat. No. 3,179,614 and U.S. Pat. No. 3,179,634.

Polyimide precursors, in addition to polyamide-acids, which can be used in the present invention include polyimino-lactones described in U.S. Pat. No. 3,282,898; polyamide-acids described in U.S. Pat. No. 3,179,614; polyamide-esters described in U.S. Pat. No. 3,312,663; U.S. Pat. No. 3,316,211, U.S. Pat. No. 3,282,897, and U.S. Pat. No. 3,326,851; polyamide-amides described in U.S. Pat. No. 3,326,863, etc. These precursors can readily be converted to the polyimide as disclosed in the aforementioned patents.

The construction of the interdiffusionally bonded polyimide film structures of the present invntion readily permits of many desirable embodiments thereof. For example, an especially preferred embodiment is characterized by a non-heat-sealable layer of polyimide of formula (1) above interdiffusionally bonded to a heat-sealable layer of polyimide. In this embodiment, the heat-sealable polyimide layer is of a much smaller class of polyimides than the non-heat-sealable layer, and is characterized by a recurring unit having the following structural formula:

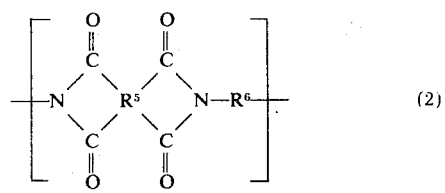 (2)

where $R^5$ is

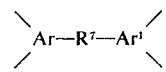

where Ar is phenylene, Ar¹ is phenylene, biphenylene or naphthylene, and R⁷ is selected from —O—, —S—,

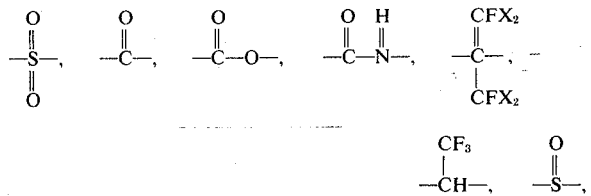

and alkylene of one through 3 carbons, where each X is separately selected from the group consisting of F and Cl; and R⁶ is selected from alkylene of seven through 10 carbons, meta-phenylene, and the following:

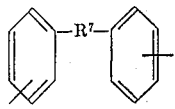

where R⁷ has the same meansing as above.

In the recurring unit shown by formula (2) above, each carbonyl group is attached to a separate carbon atom of the aromatic radicals of R⁵, the carbonyl groups on each ring being ortho to each other.

The preferred heat-sealable polyimide is that wherein R⁵ is

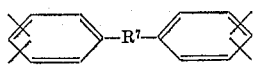

and R⁷ is selected from

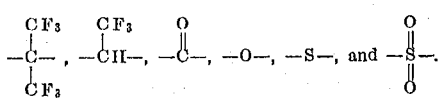

Heat-sealable polyimides which can be used in laminar structures of the present invention include those derived from the following dianhydrides:
  2,3,2',3-benzophenonetetracarboxylic dianhydride;
  3,4,3',4'-benzophenonetetracarboxylic dianhydride;
  6-(3',4'-dicarboxybenzoyl)-2,3-naphthalene dicarboxylic dianhydride;
  4'-(3'',4''-dicarboxybenzoyl)-3,4-diphenyl dicarboxylic dianhydride;
  4-(3',4'-dicarboxybenzoyloxy)phthalic dianhydride;
  4-(3',4'-dicarboxybenzamido)phthalic dianhydride;
  bis(3,4-dicarboxyphenyl) ether dianhydride;
  bis(3,4-dicarboxyphenyl) sulfide dianhydride;
  bis(3,4-dicarboxyphenyl) sulfone dianhydride;
  bis(2,3-dicarboxyphenyl) methane dianhydride;
  bis(3,4-dicarboxyphenyl) methane dianhydride;
  1,1-bis(2,3-dicarboxyphenyl) ethane dianhydride;
  1,1-bis(3,4-dicarboxyphenyl) ethane dianhydride;
  2,2-bis(2,3-dicarboxyphenyl) propane dianhydride;
  2,2-bis(3,4-dicarboxyphenyl) propane dianhydride;
  2,2-bis(3,4-dicarboxyphenyl)-1,1,1-trifluoroethane dianhydride;
  2,2-bis(3,4-dicarboxyphenyl) hexafluoropropane dianhydride;
  2,2-bis(3,4-dicarboxyphenyl)-1-chloro-1,1,3,3,3-pentafluoropropane dianhydride;
  2,2-bis(3,4-dicarboxyphenyl)-1,3-dichloro-1,1,3,3-tetrafluoropropane dianhydride;
  2,2-bis(3,4-dicarboxyphenyl)-1,1,3,3-tetrachloro-1,3-difluoropropane dianhydride; and
  position isomers of the above.

Diamines which can be used in the preparation of heat-sealable polyimides for laminar structures of the present invention include the following:
  heptamethylenediamine;
  3,3-dimethylpentamethylenediamine;
  3-methylhexamethylenediamine;
  3-methylheptamethylenediamine;
  2,5-dimethylhexamethylenediamine;
  octamethylenediamine;
  nonamethylenediamine;
  1,1,6,6-tetramethylhexamethylenediamine;
  2,2,5,5-tetramethylhexamethylenediamine;
  4,4-dimethylheptamethylenediamine;
  decamethylenediamine;
  meta-phenylenediamine;
  4,4'-diaminobenzophenone;
  4-aminophenyl-3-aminobenzoate;
  m-aminobenzoyl-p-aminoanilide;
  bis(4-aminophenyl) ether;
  bis(4-aminophenyl) methane;
  1,1-bis(4-aminophenyl) ethane;
  2,2-bis(4-aminophenyl) propane;
  4,4'-diaminodiphenyl sulfoxide;
  3,3'-diaminobenzophenone;
  2,2'-diaminobenzophenone;
  2,2-bis(4-aminophenyl)hexafluoropropane;
  2,2-bis(4-aminophenyl)-1,3-dichloro-1,1,3,3-tetrafluoropropane;
  4,4'-diaminodiphenyl sulfone;
  1,12-diaminododecane;
  1,13-diaminotridecane;

Another desirable embodiment of the unitary film structure of the present invention is that characterized by two or more layers of polyimide of formula (1) hereinabove which is non-heat-sealable. For example, such structures include a layer of non-heat-sealable polyimide of formula (1) interdiffusionally bonded to a layer of polyimide of formula (1) that contains additives such as abrasive substances, e.g., diamond, silica and silicon carbide. This embodiment provides an advantage over other abrasive polyimide structures, in that the abrasive additive is confined to the surface of the structure.

Non-heat-sealable polyimids which can be used for the laminar structures of the present invention include those derived from the following dianhydrides:
  pyromellitic dianhydride;
  3,4,9,10-perylenetetracarboxylic dianhydride;
  naphthalene-2,3,6,7-tetracarboxylic dianhydride;
  naphthalene-1,4,5,8-tetracarboxylic dianhydride;
  2,6-dichloronaphthalene-1,4,5,8-tetracarboxylic dianhydride;
  2,7-dichloronaphthalene-1,4,5,8-tetracarboxylic dianhydride;
  2,3,6,7-tetrachloronaphthalene-1,4,5,8-tetracarboxylic dianhydride;
  phenanthrene-1,8,9,10-tetracarboxylic dianhydride;
  pyrazine-2,3,5,6-tetracarboxylic dianhydride;
  benzene-1,2,3,4-tetracarboxylic dianhydride;
  thiophene-2,3,4,5-tetracarboxylic dianhydride; etc.

Non-heat-sealable polyimides which can be used for the laminar structure of the present invention also include those derived from the following diamines:
  meta-phenylenediamine;

para-phenylenediamine;
2,2-bis(4-aminophenyl) propane;
4,4'-diaminodiphenyl methane;
4,4'-diaminodiphenyl sulfide;
4,4'-diaminodiphenyl sulfone;
3,3'-diaminodiphenyl sulfone;
4,4'-diaminodiphenyl ether;
2,6-diaminopyridine;
benzidine;
3,3'-dichlorobenzidine;
3,3'-dimethoxybenzidine;
4,4'-diaminobenzophenone;
N,N-bis(4-aminophenyl)methylamine;
1,5-diaminonaphthalene;
3,3'-dimethyl-4,4'-diaminobiphenyl;
m-aminobenzoyl-p-aminoanilide;
4-aminophenyl-3-aminobenzoate;
N,N-bis(4-aminophenyl) aniline;
position isomers of the above, etc., and mixtures thereof.

The laminar structures of the present invention can be prepared by several different processes. The process provided by the instant invention comprises coating at least one surface of a base gel film structure of polyamide-acid or other polyimide precursor with a polyamide-acid composition and thereafter treating the coated base sheet so as to substantially completely convert the entire structure to polyimide polymeric material.

The base gel film structure used in the process of the present invention can be either a gel film structure per se or a solvated film structure of the polyimide precursor. The term "gel film" is used to mean a sheet of the polymeric material which is laden with volatiles, primarily solvent, to such an extent that the polymeric material is in a gel-swollen, plasticized, rubbery condition. The base gel film thickness generally falls in the range of 1.5–400 mils. The volatile content is usually in the range of 80–90 percent by weight and the polymer content usually in the range of 10–20 percent by weight of the gel film.

The gel film stage is that stage at which the film becomes self-supporting so that it can be stripped from the support on which it was cast and heated. The solvent content at which a given polymer will form a gel film depends to some extent on the amide-acid/imide ratio of the polymer, and on the structure of the polymer. By "polyamide-acid/imide" is meant a composition which is partially and incompletely cured, i.e., which is at an intermediate stage of curing from polyamide-acid to polyimide. For the purposes of this invention, this term will usually refer to compositions which have an amide-acid-to-imide ratio between 90:10 and 10:90.

The gel film structure can be prepared by the method described in U.S. Pat. No. 3,410,826 by mixing a chemical converting agent and a catalyst, such as a lower fatty acid anhydride and a tertiary amine, respectively, into a polyamide-acid solution at a low temperature, followed by casting the polyamide-acid solution in film form, on a casting drum and thereafter mildly heating the cast film at, for example, 100°C. to activate the conversion agent and catalyst for transforming the cast film to a polyamide-acid/imide gel film structure.

Another type of base gel layer which can be coated with a polyamide-acid lacquer to give a laminar article with an interdiffusional bond is a "solvated polyamide-acid" film. By this term is meant a film which is all polyamide-acid or which has only a low polyimide content, say 0 to 25 percent, and which is about 50 to 75 percent by weight polymer and 25 to 50 percent by weight solvent. Such film is sufficiently strong to be self-supporting. Film in this composition range can be obtained in several ways.

One method of preparing "solvated polyamide-acid" film is to cast a polyamide-acid solution in some suitable solvent such as N,N-dimethylacetamide (DMAC) into film form on a suitable base such as a casting drum or belt, and then to remove solvent. Solvent can be removed by use of low pressure, by application of mild heat (up to about 150°C., but preferably no greater than about 100°C.), by washing or extracting with a liquid which is a non-solvent for the polymer but miscible with the polyamide-acid solvent (such as acetone, benzene, etc.), or by a combination of these methods. When mild heat is used, a low proportion of the amide-acid units in the polymer, up to about 25 percent of them, may be cyclized to imide units. This amount of conversion in this type of base layer is not harmful, however, as the film may still be subsequently coated as described herein to give a laminar structure having an interdiffusional bond.

A second method of preparing "solvated polyamide-acid" film involves first precipitating a high-solids composition from a polyamide-acid solution by thoroughly mixing (for example, with a high-shear stirrer such as a Waring blender) with a low boiling liquid which is a non-solvent for the polymer but miscible with the polyamide-acid solvent, such as methylene chloride or petroleum ether. The precipitated polymer-containing phase is separated, and placed under vacuum to remove any of the low boiling liquid it may contain. The resulting mass will usually consist of about 50 to 75 percent by weight polymer solids and 25 to 50 percent by weight of the original solvent. After adding a small amount of additional polyamide-acid solvent, if necessary, to adjust the composition to about 50 to 65 percent solids with the aid of apparatus such as a rubber mill, the resulting tough gummy compositions may be pressed or calendered to tough film with the aid of mild heating, for example, at 100° to 110°C. This film can then be coated to give a laminar structure in accordance with this invention.

A third method of preparing "solvated polyamide-acid" film entails polymerization of the usual diamine and dianhydride at a 20 to 40 percent solids level in a medium which is a mixture of the typical good polyamide-acid solvent such as DMAC or N-methylcaprolactam and a low-boiling poor solvent or non-solvent such as methylene chloride or acetone, the amounts and proportion of the two types of solvent being chosen to result in a composition having about 50 to 75 percent solids after removal of the poor or non-solvent. Following completion of the polymerization, the low boiler is removed, for example, by milling the composition on a rubber mill at slightly elevated temperature such as 50° to 60°C. The resulting viscous gummy composition can be fabricated into film under pressure at elevated temperature, for example, in the range of 100° to 110°C. At this point, the resulting film is generally heated in the range of 50° to 100°C. to remove whatever low-boiling solvent may have remained in the composition. The resulting film can then be coated to give a laminar structure in accordance with this invention.

In accordance with the process of the invention, the base gel film is coated with a lacquer of a polyamide-acid. Application of the coating can be accomplished in any number of ways, such as by dipping or kiss-roll coating, followed by metering with a doctor knife, doctor rolls, squeeze rolls or air knife. It may also be applied by brushing or spraying. As stated above, in a preferred embodiment of the invention, the coating lacquer is that of a polyamide-acid curable to a heat-sealable polyimide defined in formula (2) above.

In coating base gel films with polyamide-acid coating solution using many of the above techniques, it is preferred that the solution have a solution viscosity of about from 2.9 to 3.8 poise. Below about 2.9 poise, bubbles form in the coating layer during coating. Above about 3.8 poise, lanes of coating in the machine direction of the film can appear when using conventional coating apparatus.

With such techniques, it is possible to prepare both one- and two-side coated structures. In preparation of the two-side coated structures, one can apply the coatings to the two-sides either simultaneously or consecutively before going to the curing and drying stage.

The polyamide-acid coating lacquer may be prepared in the manner and by the methods described in U.S. Pat. No. 3,179,614. The coating lacquer will generally be between 10 and 30 percent by weight solids. It can be applied in various wet thicknesses from as little as about 0.2 mils to as high as about 100 mils. Generally, from 0.5–5.0 mils is applied. In the case of some particular aromatic polyimides it has recently been found that the polyimides themselves are soluble materials in addition to the corresponding polyamide-acids. This is true, for example, of some polyimides based on 2,2-bis(3,4-dicarboxyphenyl)-hexafluoropropane dianhydride, such as those described in U.S. Pat. No. 3,356,648. Clearly, in the case of such soluble polyimides, a polyimide solution is eminently suitable as the coating lacquer and is considered to fall within the scope of the term polyamide-acid composition for purposes of this invention.

Preferably, no chemical conversion agent or catalyst is added to the coating lacquer applied to the base gel film. In general, excess conversion agent has been incorporated into the dope cast into the base layer. During the subsequent curing and drying operation, catalyst and excess conversion agent diffuse or pass through the coating layer as they are removed from the structure, and thus become available to aid in curing of the coating layer. Although ordinary use of conversion agent and catalyst in the base layer but not in the coating is as described above, it should be clear that these agents may be specifically added to the coating before it is applied to the base layer. The addition of chemical conversion agent and catalyst may be completely dispensed with, and thermal means only be employed for imidizing both base and coating. The use of chemical conversion agents and catalysts, and material suitable for this purpose, are described in U.S. Pat. Nos. 3,179,630 and 3,179,632. Thermal conversion is fully described in U.S. Pat. No. 3,179,634.

The conversion of the coated base film to interdiffusionally bonded polyimide film structure can be accomplished without maintaining the base film under restraint. It is preferred, however, to restrain the coated base film during conversion by using a tenter frame in order to prevent excessive film shrinkage in the transverse direction and in order to prevent wrinkling so that a flat, smooth interdiffusionally bonded laminar film is obtained. The base layer of the cured and dried laminar structures has a thickness between about 0.25 and about 100 mils, and the coating thickness may be between about 0.03 and about 10 mils.

The interdiffusionally bonded laminar film structures of the present invention are, in general, useful for the same or similar purpose as that of other polyimide films. For examples, tapes of various widths are useful as insulation when wrapped on electrical wire and cable. In the case of the preferred heat-sealable structure, the tape can be sealed in place and is especially useful for wire and cable which must resist exposure to high and low temperature stress. The particular advantage of the interdiffusionally bonded laminar structures of the present invention over those of the prior art is that the bond between the layers is markedly improved and retains significantly improved adhesive strength after exposure to high temperature and/or humidity. In the case of the heat-sealable structures, the full strength of the heat seal can be realized in practice, since the sealed structure will not fail at another point and thus cancel or eliminate the value of the strong heat seal. In other words, the reliability of the novel product of this invention is significantly superior to that of the products known heretofore. Another advantage over the prior art is that the process of manufacture is more economical than that previously employed to make laminates.

The superior bond between the layers of the laminar structure of the present invention results from the diffusion of the coating material for a short distance into the surface layers of the base film structure. Such diffusion is believed to occur during either the coating, curing or drying steps of the process. The penetration or diffusion may result in more extensive contact and bonding of the two layers by intermolecular bonding forces, and perhaps even by direct chemical bonding. In any event, it is clear that interdiffusionally bonded laminar film structures possess novel and superior properties, especially bonding properties.

The present invention is further illustrated by the following specific examples.

The test samples of the laminar structures prepared in the examples were evaluated in accordance with the following testing procedures:

HEAT-SEAL STRENGTH is measured by cutting a piece of the laminar film test sample of 4 inches by 10 inches, with the grain of the film running in the long or machine direction, into two pieces each of 4 inches by 5 inches. The two test pieces are placed in superposed relation so that opposing sealable surfaces thereof are in contact. The superimposed films are then sealed together at each end at right angles to the grain of the film by means of a ¾ inch wide sealing bar that is heated to a specified temperature in the range of 380° to 460°C. and contacts the film ends at 20 psi pressure for 30 seconds. The sealed test samples are then cut in half at right angles to the grain of the film, and the two resulting pieces are each cut along their centerline and parallel to the grain of the film to provide 1 inch wide strips. The resulting four sets of strips are tested for heat-seal strength by securing the free ends thereof in a Suter testing machine and pulling the test samples apart. The highest force in grams required to pull the strips apart is taken as a measure of the heat-seal bond strength.

HUMIDITY RESISTANCE of conductors wrapped with laminar film structures of the invention was measured in accordance with MIL-W-81381(AS), paragraph 4.7.5.14.

INSULATION RESISTANCE of conductors wrapped with laminar film structures of the invention was measured in accordance with MIL-W-81381(AS), paragraph 4.7.5.2.

To calculate inherent viscosity, the viscosity of the polymer solution is measured relative to that of the solvent alone.

Inherent viscosity = [natural logarithm (Viscosity of solution/Viscosity of solvent)/C ]

where C is the concentration expressed in grams of polymer per 100 milliliters of solution. As known in the polymer art, inherent viscosity is directly related to the molecular weight of the polymer.

EXAMPLE 1

A base gel film of polyamide-acid/imide based on pyromellitic dianhydride and 4,4'-diaminodiphenyl ether was prepared by adding slowly in portions 2,180 gms. (10 mols) of pyromellitic dianhydride (PMDA) to a solution of 2,000 gms. (10 mols) of 4,4'-diaminodiphenyl ether (DDE) in 23,690 gms. of N,N-dimethylacetamide (DMAC) maintained at a temperature below 60°C. The resulting 15 percent solids solution of the polyamide-acid was cooled to 0°C., and while maintained at this temperature, 4,080 gms. (40 mols) of acetic anhydride and 1,860 gms. (20 mols) of beta-picoline were added. The resulting composition was cast onto a drum heated at 100°C. in film form having a thickness of about 10 mils (which results in a nominal dry polyimide film thickness of 1 mil). The cast film was held on the drum for about 10 seconds, after which it was stripped from the drum as a self-supporting gel polyamide-acid/imide film.

The gel film was coated in a continuous operation with a 15 percent solids coating lacquer prepared from 322.24 gms. (1.00006 mol) of benzophenone-3,4,3',4'-tetracarboxylic dianhydride and 200.00 gms. (0.9988 mol) of 4,4'-diaminodiphenyl ether in 2,960 ml. of DMAC. The polymer of the coating lacquer had an inherent viscosity of 0.75, measured on a 0.5 percent by weight solution in DMAC at 30°C., and had a solution viscosity below 10 poise. The base gel film was coated on both sides at a rate of 16 inches per minute by dipping it into a tank of the coating lacquer, bringing it in contact with two fixed wiper rods, one on each side of the film, and contacting it with a single idler roll wound with 65 mil (1/16th inch) diameter aluminum wire. The coated base gel film was secured to a pin-type tenter frame, and then cured and dried by passing through an oven having a temperature of about 200°C. at the entrance and increasing to about 400°C. at the exit, the residence time in the oven being about 5 minutes. The coating thickness was estimated by both an Ames thickness gauge and by unit weight measurements to be 0.2 - 0.3 mils total (0.1 - 0.15 mils per side). The strength of heat seals, both side-1-to-side-2 and side-2-to-side-2, prepared at both 420°C. and 440°C. at 40 psi for 30 seconds ranged between 400 -500 gms./in. The coated film was found to have a dielectric constant of 3.32 and a dissipation factor of 0.00197, both measured at 1,000 cycles per second at room temperature. The volume resistivity was found to be $5.63 \times 10^{17}$ ohm-centimeters. Of six samples examined for DMAC content by vapor phase chromatography, none showed any DMAC content.

The coated film prepared above was slit into ¼ in. wide tape. A No. 22 Unilay silver-coated copper conductor was then insulated by wrapping with two layers of the tape, using a commercially available wire wrapping machine. Both wraps were laid down in the same direction along the wire but with opposite hand, that is, the first wrap was clockwise and the second wrap counter-clockwise. Each wrap was applied with an overlap of 50 percent. After both wraps were laid down, the insulation was sealed in place by passing it through an oven four feet long heated at 450°C. The wire had an insulation resistance of $1.04 \times 10^{12}$ ohms/thousand feet and a humidity resistance of $3.60 \times 10^9$ ohms/thousand feet, as measured in accordance with paragraphs 4.7.5.2 and 4.7.5.14 of Military Specification MIL-W-81381(AS). Of five samples of the insulated wire aged for 5 days at 275°C., none showed any dielectric failure in the 2,500 volt dielectric test and all five still passed the reverse bend test as described in paragraph 4.7.5.10 of the Military Specification MIL-W-81381(AS).

EXAMPLE 2

The gel polyamide-acid/imide film used for this example was identical to that described in Example 1, except that when dry the base film was approximately 1.2 mils thick. The coating lacquer was a polyamide-acid solution prepared from 322.24 gms. (1.00006 mols) of benzophenone-3,4,3',4'-tetracarboxylic dianhydride and 200.00 gms. (0.9988 mols) of 4,4'-diaminodiphenyl ether in 2,960 ml. of DMAC. The coating polymer had an inherent viscosity of 0.54, measured on a 0.5 percent by weight solution in DMAC at 30°C., and the lacquer had a solution viscosity of between 3 and 5 poises. The gel film was coated at a rate of 24 in./min. on one side only by bringing it in contact with an air-driven rotating applicator roll which dipped into a trough of the coating lacquer. After receiving the coating lacquer, the coating film was brought into contact with a fixed metering rod wrapped with No. 13 (13 mil diameter) stainless steel wire. The coated film was fixed onto a pin-type tenter frame and dried under the same conditions as described in Example 1. Samples of film were heat-sealed together at various temperatures at 40 psi for 30 seconds. Heat seal strength values average value of six seals are tabulated in Table 1 below.

TABLE I

| Temperature of Seal, °C. | HEAT SEAL STRENGTH (grams/inch) | |
|---|---|---|
| | Coated Side to Coated Side | Coated Side to Uncoated Side |
| 380 | 837 | 143 |
| 400 | 1127 | 167 |
| 420 | 850 | 203 |
| 444 | 687 | 213 |
| 460 | 767 | 340 |

The coated film, as prepared above, was slit into ¼ in. wide tape. It was wound onto wire as described in Example 1 with the exception that the first wrap was wound with the coated side away from the wire with an overlap of 55 percent, and the second wrap was wound with the coated side twoard the wire with an overlap of 58 percent. The finished wire had an insulation resistance of $1.25 \times 10^{11}$ ohms/thousand feet and a humidity resistance of $5.00 \times 10^9$ ohms/thousand feet. Of five samples aged for 5 days at 275°C., all five samples passed the reverse bend test and none showed dielectric failure.

EXAMPLE 3

The procedure of Example 2 was repeated with the exception that the coating lacquer was a 13.5 percent solids polyamide-acid solution prepared from 288.50 gms. (0.8053 mol) of bis(3,4-dicarboxyphenyl) sulfone dianhydride (CSDA) and 161.50 gms. (0.8056 mol) of 4,4'-diaminodiphenyl ether (DDE) in 2,925 ml. of DMAC. This polyamide-acid had an inherent viscosity of 0.84, measured on a 0.5 percent by weight solution in DMAC at 30°C. The coating of the dried film could not be peeled from the base sheet. The strength of heat seals of this coated film are given in Table II, all values being averages of six seals.

TABLE II

| Temperature of Seal, °C. | HEAT SEAL STRENGTH (grams/inch) | |
|---|---|---|
| | Coated Side to Coated Side | Coated Side to Uncoated Side |
| 380 | 850 | 80 |
| 400 | 1017 | 80 |
| 420 | 912 | 80 |
| 440 | 867 | 213 |
| 460 | 777 | 190 |

The coating thickness was measured by infrared absorption to be 14.95 microns, which is attributed to the polyimide of CSDA and DDE; the polyimide of PMDA and DDE is essentially transparent at this frequency. By this technique it was estimated that the coating thickness of the film of this example was 0.05 mil.

A wire conductor was wrapped with ¼ in. wide tape of this coated film in the manner described in Example 2. The insulated wire had an insulation resistance of $5.68 \times 10^{10}$ ohms/thousand feet and a humidity resistance of $4.55 \times 10^9$ ohms/ thousand feet. Of five samples of the insulated wire aged for 5 days at 275°C. all five passed the reverse bend test and none showed dielectric failure.

EXAMPLE 4

A 15 percent solids polyamide-acid coating lacquer was prepared from 351.00 gms. (0.9797 mol) of bis(3,4-dicarboxyphenyl) sulfone dianhydride and 200.00 gms. (0.9988 mol) of 4,4'- diaminodiphenyl ether in 3,162 ml. of DMAC. It had an inherent viscosity of 0.63, measured on a 0.5 percent by weight solution in DMAC at 30°C. A duplicate preparation had an inherent viscosity of 0.60. The two batches were combined for use in a single coating run.

A polyamide-acid/imide gel film based on pyromellitic dianhydride and 4,4'-diaminodiphenyl ether, as described in Example 1, was one-side coated with the above coating lacquer in a procedure as described in Example 2. In this example, after the coating was applied to the base gel film, the film was brought into contact with one of three different fixed wiping rods, either a ½ inch stainless steel rod, a similar rod wrapped with 12.6 mil wire, or a similar rod wrapped with 18 mil wire. By using the infrared technique described in Example 3, it was estimated that the coating thickness of the dry film applied by the bare rod was 0.023 mil, that applied by the 12.6 mil wire-wound rod was 0.051 mil, and that applied by the 18 mil wire-wound rod was 0.080.

Samples of the three different films were heat sealed, coated-side to coated-side, at various temperatures at 40 psi for 30 seconds. It was found that the film which had been wiped with the bare rod could not be heat sealed. Seal strengths for the two films wiped with wire-wound rods are given in Table III below.

TABLE III

| Temperature of Seal, °C. | HEAT SEAL STRENGTH (grams/inch) Coated with Wire-Wound Rod | |
|---|---|---|
| | 12.6 mil wire | 18 mil wire |
| 380 | 322 | 387 |
| 400 | 266 | 448 |
| 420 | 182 | 452 |
| 440 | 210 | 505 |
| 460 | 215 | 528 |

EXAMPLE 5

A polyamide-acid coating lacquer was prepared from 351 gms. of bis(3,4-dicarboxyphenyl) sulfone dianhydride and 200 gms. of 4,4'-diaminodiphenyl ether in 3,162 ml. of DMAC. A duplicate preparation of this lacquer was made and the two were combined. The inherent viscosity of the combined material was 0.64, measured on a 0.5 percent by weight solution in DMAC at 30°C.

This lacquer was coated onto a polyamide-acid/imide gel film based on pyromellitic dianhydride and 4,4'-diaminodiphenyl ether of the type described in Example 1. The gel film was passed through a dip tank of the coating lacquer, wiped on each side with a fixed ½ inch diameter stainless steel rod wound with 12.6-mil diameter wire, and then dried under the conditions described in Example 1.

The heat sealability of the coated film was evaluated on both of its surfaces; one surface was designated side 1 and the other surface was designated side 2, and samples were prepared by heat sealing specimens of side 1 together and of side 2 together, over the temperature range 380°C. to 460°C. at 40 psi for 30 seconds. All of the bonds were sufficiently strong that none of the seals could be peeled, but rather they were film tearing bonds.

A wire conductor was insulated with ¼ inch tape of this coated film in the manner described in Example 1. The wire had an insulation resistance of $1.25 \times 10^{12}$ ohms/thousand feet and a humidity resistance of $4.17 \times 10^{10}$ ohms/thousand feet. Of five samples of the wire aged for 5 days at 275°C., all five passed the reverse bend test and none showed dielectric failure.

EXAMPLE 6

A polyamide-acid coating lacquer was prepared from 351 grams of bis(3,4-dicarboxyphenyl) sulfone dianhydride and 200 grams of 4,4'-diaminodiphenyl ether in 2,500 ml. of DMAC. It had an inherent viscosity of 0.53, measured on a 0.5 percent by weight solution in DMAC at 30°C. This coating lacquer was coated onto one side of a base polyamide-acid/imide gel film by the procedure described in Example 2. By infrared analysis, the coating thickness was estimated to be 0.06 mil. Samples of the film were heat sealed, coating-to-coating, at various temperatures at 40 psi for 30 seconds. Table IV below shows the values for the heat seal strengths, all of which were film tearing bonds; all values are averages of seven determinations.

TABLE IV

| Temperature of Seal, °C. | Heat Seal Strength (grams/inch) |
|---|---|
| 380 | 660 |
| 400 | 743 |
| 420 | 614 |
| 440 | 514 |
| 460 | 571 |

The coated film was also sealed to copper foil. These composites were prepared at various temperatures at 40 psi for 30 seconds. The bond strengths, which are averages of seven determinations of the coated film to the copper foil are shown in Table V.

TABLE V

| Lamination Temperature, °C. | Seal Strength |
|---|---|
| 420 | 127 g./in. (bond peeled) |
| 440 | 358 g./in. (film-tearing bond) |
| 460 | 314 g./in. (film-tearing bond) |

It was also found that a weak bond, 80 gms./in., could be obtained upon sealing the coated film at 460°C. at 40 psi for 30 seconds to a copper foil having a copper oxide surface.

EXAMPLE 7

The purpose of this example is to show the comparatively poorer adhesion between the coating and base layers obtained when a previously dried base film is coated with a heat sealable coating.

A 15 percent solids polyamide-acid coating lacquer was prepared from 351.00 gms. of bis(3,4-dicarboxyphenyl) sulfone dianhydride and 200.00 gms. of 4,4'-diaminodiphenyl ether in 3,162 ml. of DMAC. Duplicate preparations were made, the first having an inherent viscosity of 0.63 and the second 0.60, measured on a 0.5 percent by weight solution in DMAC at 30°C. Solution viscosities were in the range of 3 to 5 poise. The two batches were combined for coating purposes.

A 1-mil base sheet of dry polyimide based on pyromellitic dianhydride and 4,4'-diaminodiphenyl ether was passed through a dip tank containing the coating lacquer described above, passed between doctor rolls set with a 4-mil gap, passed in contact with smoothing rolls on each side of the film, then dried in two stages, first at 160°C., then at 265°C. at a speed of 5 ft./min. Analysis by vapor phase chromatography indicated the coated film to contain 0.25 percent by weight residual DMAC. The heat sealing characteristics of this coated film were tested at various temperatures at 40 psi for 30 seconds. The results are tabulated in Table VI below (all values in Table VI are averages of twelve determinations).

TABLE VI

| Temperature of Seal, °C. | Heat Seal Strength (grams/inch) |
|---|---|
| 380 | nil |
| 400 | 57 |
| 420 | 10 |
| 440 | 90 |
| 460 | 105 |

A wire conductor was wrapped with ¼ in. wide tape of this film and sealed at 450°C., as described in Example 1. The insulation could be easily peeled from the wire. When pressure sensitive adhesive tape was applied to the coated film and peeled away, the coating was removed with the tape, and the coating to base sheet bond was in this way measured to be 120 and 180 g./in. for the two sides of the film.

EXAMPLE 8

A 15 percent solids casting dope of polyamide-acid based on pyromellitic dianhydride and 4,4'-diaminodiphenyl ether in N,N-dimethylacetamide (DMAC) having a solution viscosity of 1,700 poise was cast in film form into a 1:1 volume mixture of acetic anhydride and beta-picoline in order to prepare a base gel film. A 15 percent solids coating solution of polyamide-acid based on 2,2-bis(3,4-dicarboxyphenyl)hexafluoropropane dianhydride and 4,4'-diaminodiphenyl ether in DMAC was coated onto part of the gel film with a 1.5 mil precision doctor knife, and onto the remainder of it with a stainless steel rod. The coated gel films, clamped to frames, were cured and dried at 300°C. for 20 minutes. Coating thicknesses were estimated with an Ames gauge to be about 0.1 mil for those samples coated with the doctor knife, and somewhat less than 0.1 mil for those coated with the rod. The films were heat sealed, coated side to coated side, at various temperatures at 40 psi for 30 seconds. Values of the peel strength of the heat seals are given in Table III (all values in Table VII are averages of six determinations for each sample).

TABLE VII

| Temperature of Seal, °C. | Doctor Knife Coated | Rod Coated |
|---|---|---|
| 420 | 310 g./in. | 260 g./in |
| 460 | 687 | 637 |

EXAMPLE 9

A polyamide-acid dope like that described in Example 8 was cast into film about 10 mils thick (to give nominal 1-mil film when dry) and samples of the base gel film were placed in a 1:1 volume ratio bath of acetic anhydride and beta-picoline for 5 minutes. The base gel films were then wiped free of excess solvent and were coated with a 15 percent solids coating lacquer of polyamide-acid based on 4,4'-diaminodiphenyl ether and a 2:1 molar ratio of bis(3,4-dicarboxyphenyl) sulfone dianhydride (CSDA) and pyromellitic dianhydride in DMAC, applied with a 1.5 inch diameter stainless steel rod. The coated gel films, clamped to frames, were cured and dried at 300°C. for 20 minutes. The coating thickness was estimated to be about 0.1 mil. Coating to coating heat seals were then prepared at various temperatures at 40 psi for 30 seconds. The seals were found to be strong, film tearing bonds. The strength of seals made at 420°C. averaged 443 gms./in., and at 460°C., 500 gms./in.

EXAMPLE 10

A casting dope for a base film like that of Example 8 was cast into film 10 mils thick (to give, after drying, film 1 mil thick) and converted to gel film by immersion into a 1:1 volume mixture of acetic anhydride and pyridine. Samples of the gel film were then coated with a lacquer prepared from 11.943 gms. (0.0333 mols) of bis(3,4-dicarboxyphenyl) sulfone dianhydride, 3,633 gms. (0.0167 mols) of pyromellitic dianhydride, and 10.000 gms. (0.0500 mols) of 4,4'-diaminodiphenyl ether in 158 ml. of DMAC. The coated gel films, clamped to frames, were dried for several minutes at 280°C. then for 20 minutes at 300°C. Coating-tocoating heat seals were prepared at 20° intervals between 380° and 460°C. at 40 psi for 30 seconds; the highest seal strength observed was 733 gms./in. (average of 6 seals).

The same copolymer coating lacquer was also coated onto dry polyimide film based on pyromellitic dianhydride and 4,4'-diaminodiphenyl ether with a 1.5 mil doctor knife at 80°C. The coated films were dried at 300°C. for 30 minutes under nitrogen and vacuum. Coating-to-coating heat seals were prepared as above, at 20° intervals between 380°C. and 460°C. at 40 psi for 30 seconds; the highest seal strength observed was 330 gms./in. (average of 6 determinations).

We claim:

1. An article of manufacture comprising a unitary laminar film structure having at least two layers of polyimide polymeric material interdiffusionally bonded together throughout an interface having a thickness of at least 25 angstroms, wherein the polyimide is characterized by the repeating structural unit of formula (1):

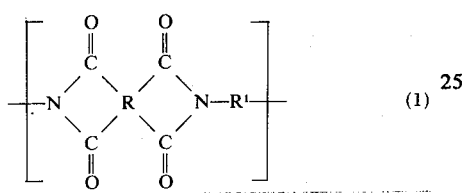
(1)

where R is selected from tetravalent aromatic organic radicals, including substituted derivatives thereof, having the following structural formulas:

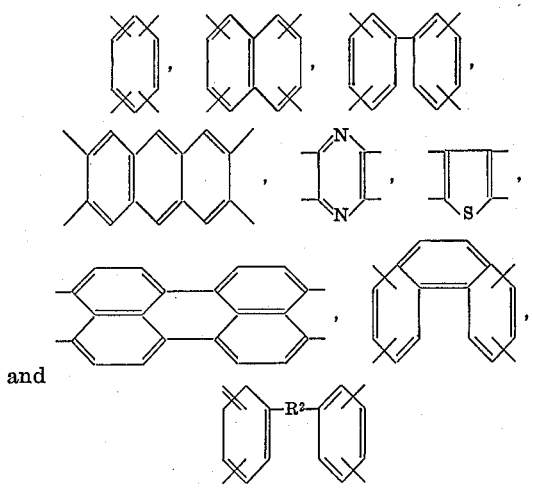

and where $R^2$ is selected from alkylene of one-third carbon atoms, oxygen, sulfur, and radicals having the following structural formulas:

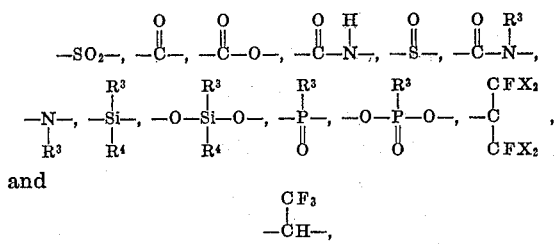

wherein $R^3$ and $R^4$ are selected from alkyl and aryl, and substituted groups thereof, and each X is separately chosen from the group consisting of F and Cl, the said R being such as obtained from a dianhydride of the formula:

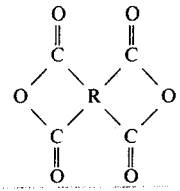

where R has the same meaning as above; and where $R^1$ is a divalent radical of at least two carbon atoms.

2. An article of claim 1 wherein a stratum of the polyimide of formula (1) is interdiffusionally bonded to a stratum of heat-sealable polyimide having the repeating structural unit of formula (2):

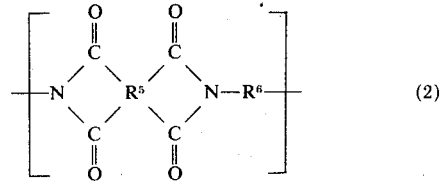
(2)

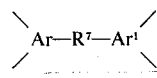

where Ar is phenylene, $Ar^1$ is phenylene, biphenylene or naphthylene, and $R^7$ is selected from —O—, —S—

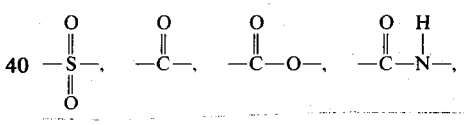

and alkylene of one through three carbons, where each X is separately selected from the group consisting of F and Cl; and $R^6$ is selected from alkylene of seven through 10 carbons, meta-phenylene, and the following:

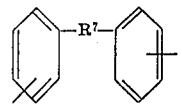

where $R^7$ has the same meaning as above; each carbonyl group being attached to a separate carbon atom of the aromatic radicals of $R^5$, the carbonyl groups on each ring being ortho to each other.

3. An article of claim 1 wherein a stratum of non-heat-sealable polyimide having the repeating structural unit of formula (1) is interdiffusionally bonded to a stratum of heat-sealable polyimide having the repeating structural unit of formula (2).

4. An article of claim 1 having a thickness of at least about 1 mil.

* * * * *